United States Patent [19]
Plasscheart

[11] Patent Number: 4,879,571
[45] Date of Patent: Nov. 7, 1989

[54] DUPLEX PRINTING DEVICE

[75] Inventor: Paul E. Plasscheart, Limehouse, Canada

[73] Assignee: Delphax Systems, Mississauga, Canada

[21] Appl. No.: 126,160

[22] Filed: Nov. 30, 1987

[30] Foreign Application Priority Data

Dec. 3, 1986 [CA] Canada ........ 524416

[51] Int. Cl.[4] ........ G03B 27/32; G03B 27/52
[52] U.S. Cl. ........ 355/26; 355/24; 271/225; 271/186
[58] Field of Search ........ 355/24, 26; 271/184, 271/185, 186, 225

[56] References Cited

U.S. PATENT DOCUMENTS

| | | | |
|---|---|---|---|
| 3,548,783 | 12/1970 | Knapp | 355/26 |
| 3,942,785 | 3/1976 | Stange | 271/184 |
| 4,579,446 | 4/1986 | Fujino et al. | 355/26 |

*Primary Examiner*—Monroe H. Hayes
*Attorney, Agent, or Firm*—Rogers & Scott

[57] ABSTRACT

The invention provides apparatus for coupling a pair of imaging units to receive paper along a first path from a first unit, and to invert and transfer the paper along a second path entering the second unit. Embodiments include one which in addition to inverting the paper provides an alternative path for paper so that the paper passes through one imaging unit only, and one which allows paper to pass through one or the other of the imaging units selectively.

5 Claims, 6 Drawing Sheets

DUPLEX PRINTING DEVICE

This invention relates to paper handling apparatus for use in inverting paper passing between two single-sided imaging units to permit two-sided imaging, and also in related embodiments to selective single-sided or double-sided imaging.

Imaging units such as printers used as output devices for computers and copiers are becoming simpler, more efficient, and less costly. However, most simple imaging units are not capable of imaging both sides of the paper. This feature adds significantly to the complexity and cost of the unit.

It has long been recognized that imaging on both sides (duplex imaging) can be obtained by first imaging on one side and then running the paper (with proper orientation) to put a second image on the other side. Such a procedure is costly both because of operator involvement and because of errors in orientation resulting in incorrect image relationships. If much of this work is undertaken, the tendency is to invest in more sophisticated and expensive equipment which may well be used more extensively for single-sided copying than for duplex copying.

In one of its embodiments the invention is intended to provide an alternative approach by linking a pair of one-sided imaging units such that duplex imaging can be undertaken by feeding the paper serially through the units while retaining the use of at least one of the units for one-sided imaging. The units can be printers, copiers, or one copier and one printer. Clearly when two similar units are used it is unlikely that both units will fail simultanteously, so that inversion provides the added advantage of better reliability for the user.

Accordingly, in one of its aspects the invention provides apparatus for coupling a pair of imaging units to receive paper along a first path from a first unit, and to invert and transfer the paper along a second path entering the second unit. Embodiments include one which in addition to inverting the paper provides an alternative path for paper so that the paper passes through one imaging unit only, and one which allows paper to pass through one or the other of the imaging units selectively.

The overall combinations of imaging units and the aforementioned apparatus are also within the scope of the invention.

The invention will be better understood with reference to the accompanying drawings, in which.

Figure 1:
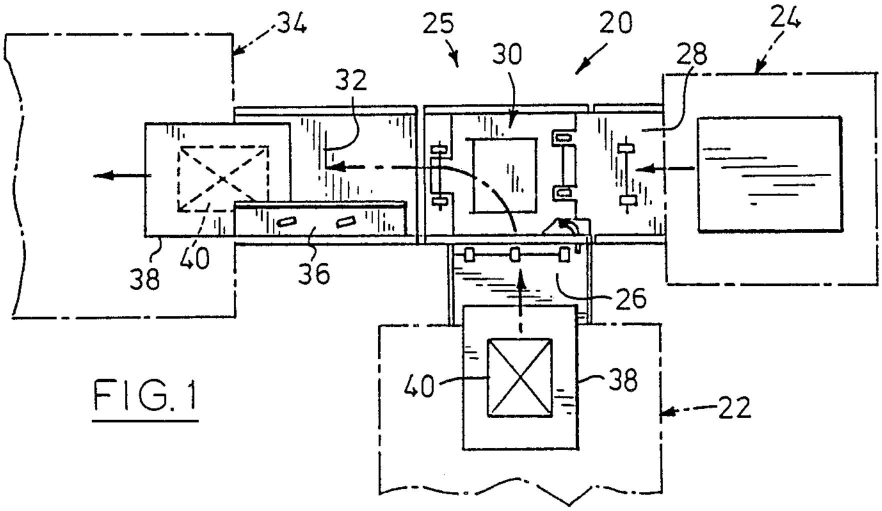
FIG. 1 is a diagrammatic plan view of apparatus including a paper transfer station according to a preferred embodiment of the invention and which is for use with two imaging devices to selectively create images on both sides or one side of a sheet of paper.
Figure 9:
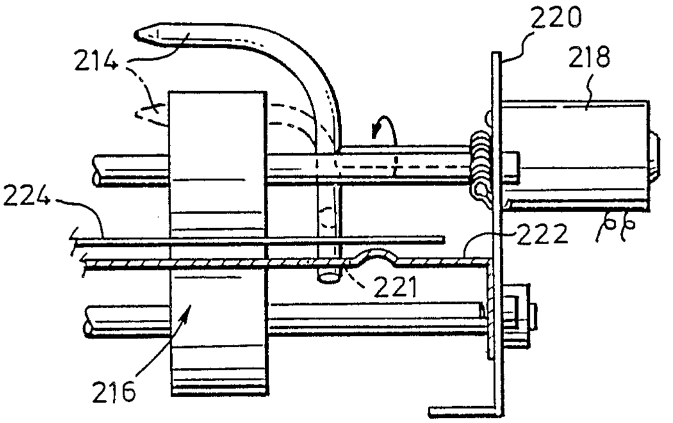
Figure 6:
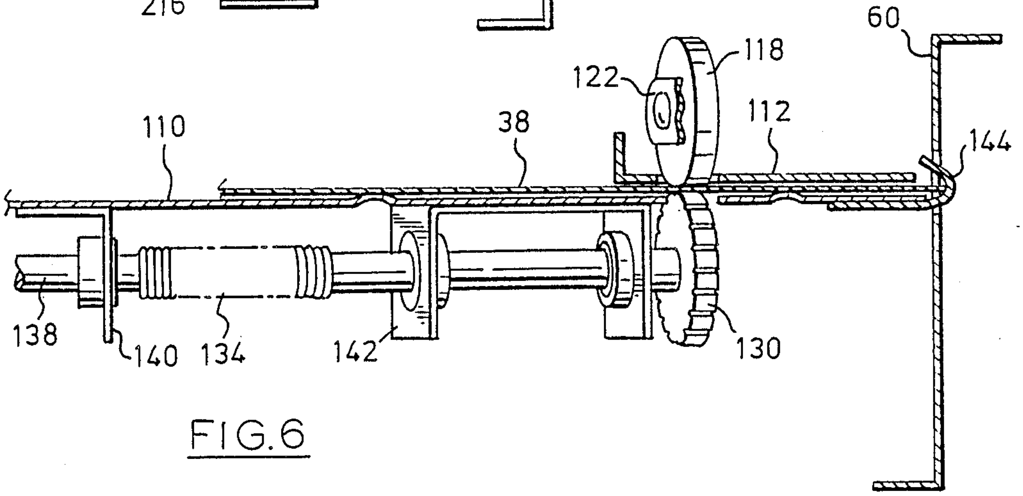
Figure 5:
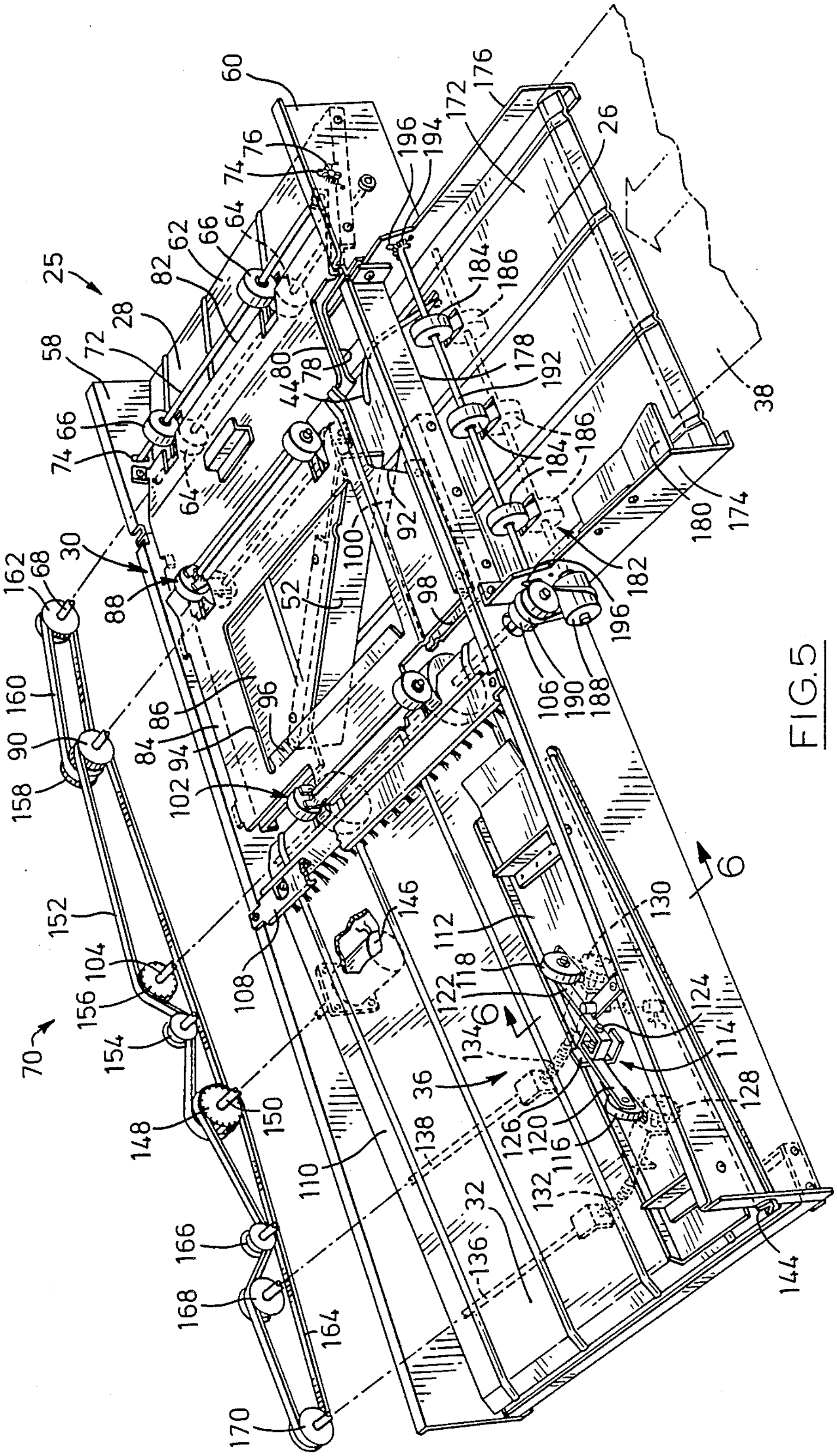
FIG. 5 is a perspective view of the apparatus.
Figure 7:
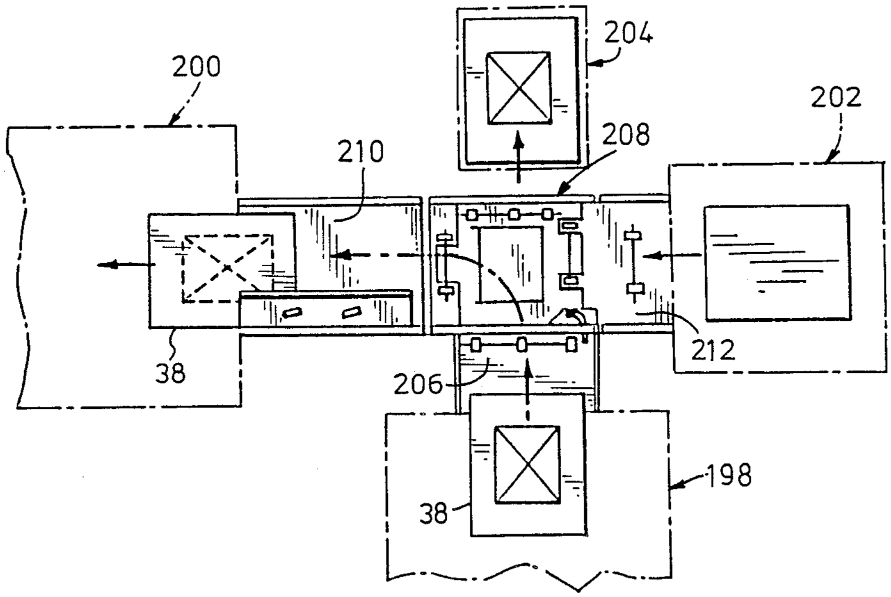
Figure 8:
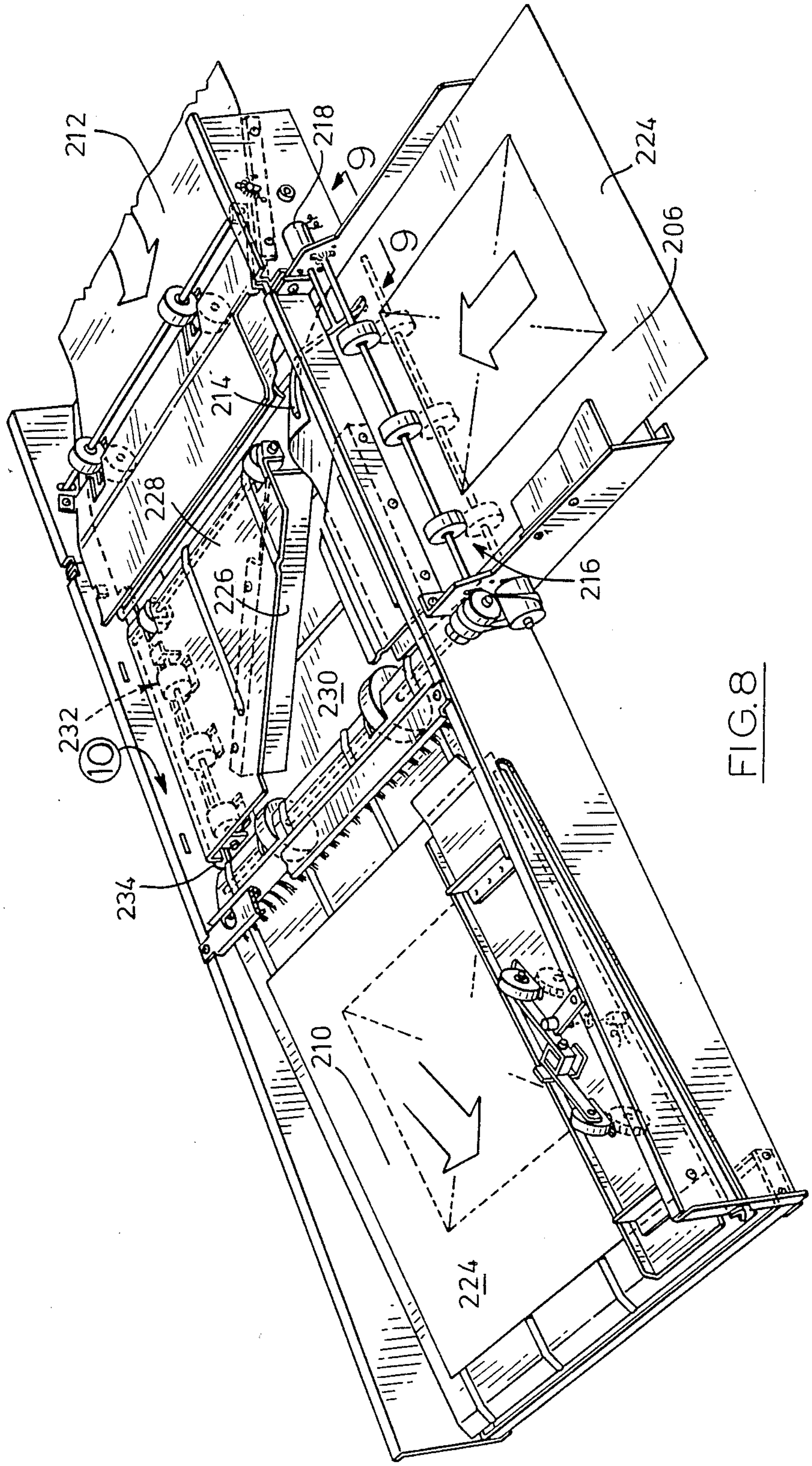
Figure 10:
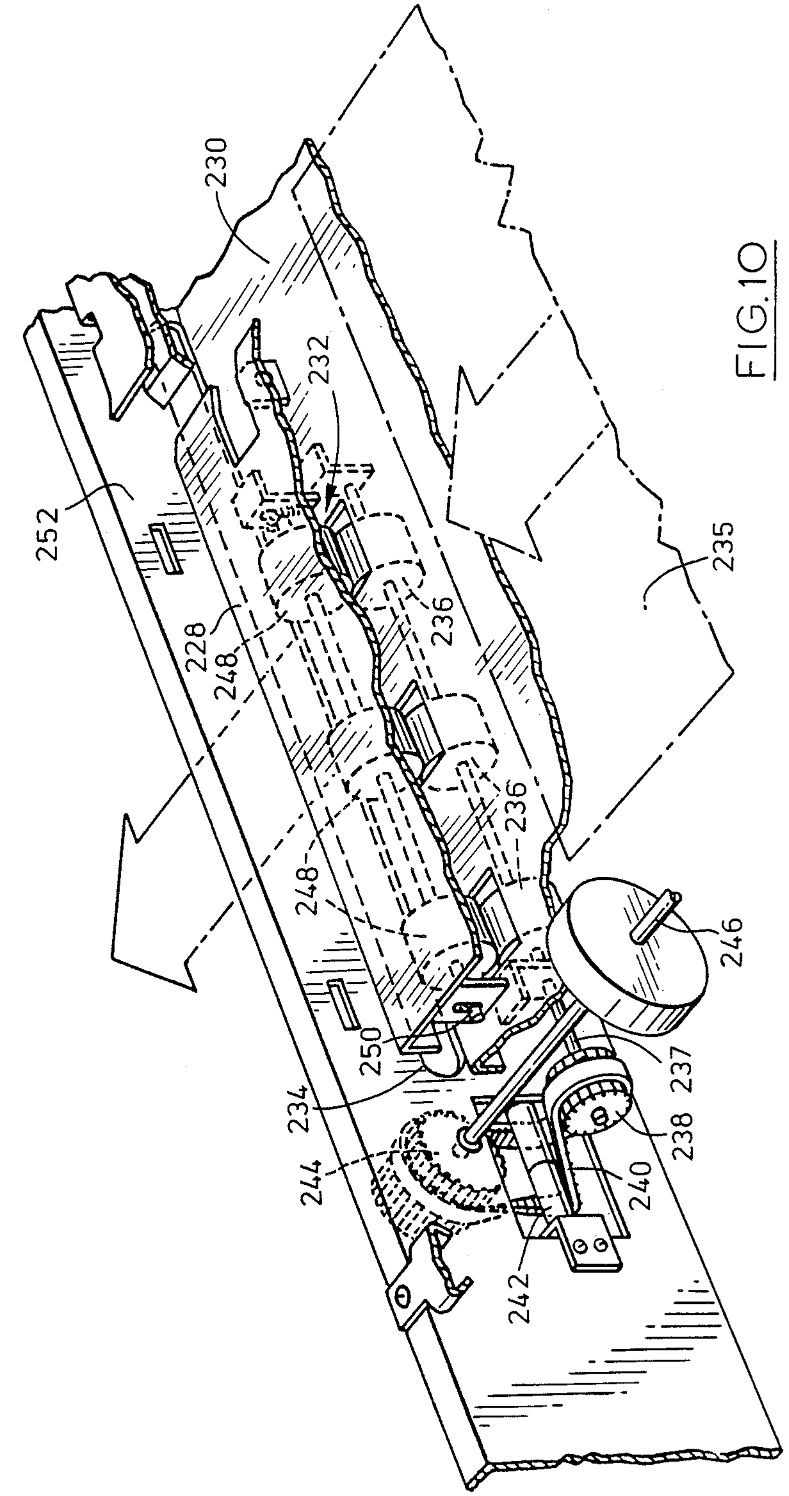

FIG. 6 (drawn on the same page as FIG. 1) is a sectional view on line 6—6 of FIG. 5 and drawn to a larger scale;

FIG. 7 is a view similar to FIG. 1 and illustrating apparatus having a transfer station of a type for use with two imaging devices, a paper supply unit, and a paper receiving unit according to another preferred embodiment of the invention which permits imaging on both sides of a sheet of paper or on one side, as well as one-sided imaging on different sheets of paper using both imaging devices simultanteously;

FIG. 8 is a view similar to FIG. 5 with portions removed to better illustrate details of the structure, and showing paper sheets in various positions as they are transported through the apparatus;

FIG. 9 (drawn adjacent to FIG. 1) is a sectional view on line 9—9 of FIG. 8 and drawn to a larger scale; and FIG. 10 is a perspective view of a part of the transfer station shown in FIG. 8 in the area indicated by the circled numeral "10" and drawn to a larger scale.

The invention in its various forms will be described with reference to its use generally with "imaging devices" which may be printers, copiers or a combination of a printer and a copier as will become apparent from the following description.

Reference is made firstly to FIG. 1 which shows apparatus 20. The purpose of this arrangement is two-fold, firstly to receive paper from a one-sided imaging unit 22 for duplex imaging, and secondly to receive plain paper from a paper supply unit 24 for single-sided imaging.

When double-sided imaging is required, paper is first imaged in unit 22 and then, with an image on a front side it enters apparatus 25 at an entry path 26. The paper sheet is then inverted in a transfer station 30 before passing along an exit path 32 to be received in another imaging unit 34. This second imaging unit creates an image on the obverse side of the paper which has now been inverted. As will be described, the paper is driven through the system in such a way that it is maintained in tension to avoid wrinkling or loss of control of the paper as it travels from unit 22 to unit 34.

In the event that an image is required on one side only, then paper will be drawn from the supply unit 24, passed along an entry path 28, through the transfer station 30 to the exit path 32 and then to the unit 34 where it receives the image.

Clearly the transfer station 30 is capable of receiving paper from either of the paths 26 or 28 and delivering the paper to the path 32 where it is moved by a locating mechanism 36 into proper alignment for entry into the unit 34.

Figure 2:
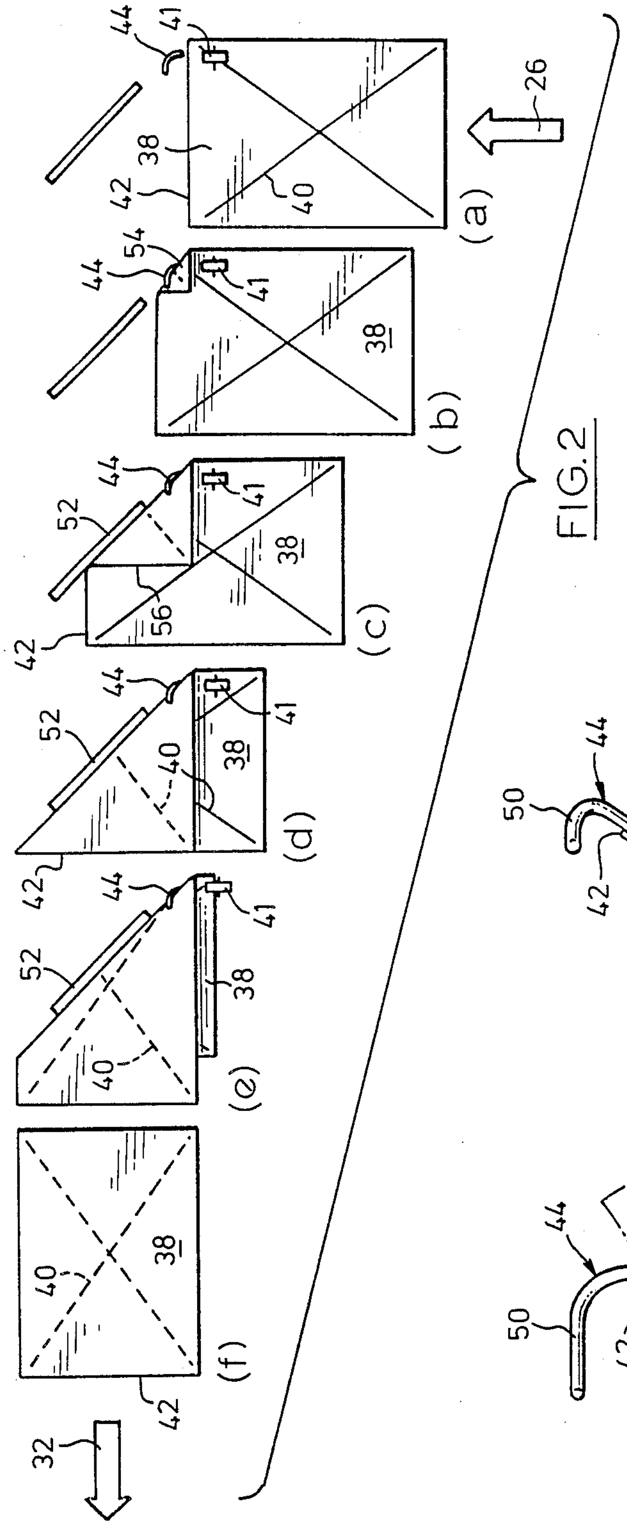
FIG. 2 is a series of diagrammatic representations labelled (a) to (f) illustrating the curling of a moving sheet of paper to invert the paper and direct it along another path.
Figure 4:
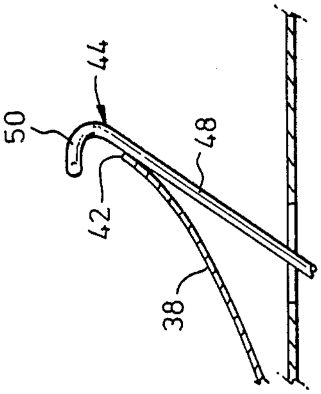
FIG. 4 is a side view of the paper curler showing the sheet of paper moving into engagement with the curler.
Figure 3:
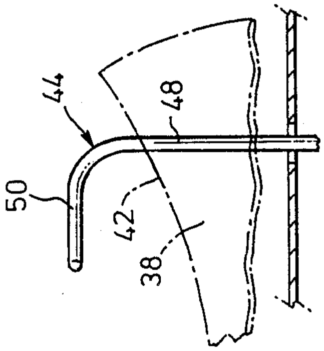
FIG. 3 is a front view looking in the direction followed by the moving sheet of paper of a paper curler used to invert the paper and direct it along another path.

Reference is next made to FIG. 2 to illustrate in general terms how paper is inverted in the transfer station and directed from the entry path 26 through 90 degrees to leave by the exit path 32. Progressing from the right of FIG. 2, (to duplicate the passage through the apparatus as drawn in FIG. 5), a paper sheet 38 is received from the imaging unit with an image 40 on its upper surface. As the paper moves forwardly it passes under a pulley wheel 41 and a leading edge 42 meets a paper curler 44 which is also seen in FIGS. 3 and 4. FIG. 3 is a view looking essentially in the direction of the arrow 26 shown in FIG. 2 part (a) and it will be seen that the paper sheet shown in ghost outline rides up a ramp portion 48, but is held down by wheel 41. This is also seen to some extent in FIG. 4 (which is a view from the side). The leading edge then meets a hooked upper portion 50 where the rising edge of the paper 42 is deflected rearwardly into a curl 54 as seen in FIG. 2, view (b). The wheel 41 ensures that the paper does not "spring" flat at this point.

The initiation of a curl seen in view (b) continues as the paper progresses to position (c) where it has met a guide bar 52 which is aligned with the curl 54 to stabilize the curl as it increases in size. The bar ensures that a portion 56 of the leading edge progresses at right angles to the input direction of the sheet of paper. The movement continues through portion (d) where all of the leading edge 42 is now travelling in the new direction, and eventually the paper is turned completely as can be seen in view (f). The image 40 is now on the bottom side of the sheet with the same leading edge 42 progressing towards the second imaging unit 34 (FIG. 1).

It will of course be common to move the paper through 90 degrees as shown in FIG. 2 but this angle can be varied if required simply by changing the alignment of the paper curler 44 and guide bar 52 with reference to the input direction 26 There is a "reflection" effect so that if the angle of the output is to be 90 degrees with reference to the input, then the bar must lie at 45 degrees to the input direction. In general the angle between the directions of input and output will be twice the angle between the input direction and the bar 52.

Reference is next made to FIG. 5 which illustrates the embodiment of the invention shown diagrammatically in FIG. 1 and incorporating the paper curler 44 described with reference to FIGS. 2–4.

The apparatus 25 includes, as previously mentioned with reference to FIG. 1, entry paths 26 and 28, transfer station 30, and exit path 32. The apparatus is built around a pair of side elements 58, 60 which extend from the beginning of the entry path 28 to the end of the exit path 32. Between these elements, and forming part of the transfer station 30, are a series of guide plates being essentially in top and intermediate planes with the entry path defining a bottom plane. The guide plates are spaced vertically to define an upper path between the top and intermediate plates for paper received either from the entry path 28 or, after curling, from a lower path defined by entry path 26. In order to better understand the transfer station 30, it will be described initially with reference to paper originating from the entry path 28 and then subsequently with reference to paper from the path 26.

Consider paper entering the path 28. The paper will ride on a ramp 62 projected conventionally by the paper supply unit 24 (FIG. 1) to come into engagement with a nip formed between driven lower rollers 64 and corresponding idler rollers 66. The rollers 64 are attached to a shaft 68 forming part of a drive train 70 which will be described later. The shaft is mounted in suitable bearings in the side elements 58, 60 and an idler shaft 72 is also carried by the elements 58, 60 but rides in a pair of slots 74 biased downwardly by a pair of anchored coil springs 76 (one of which can be seen). These springs are attached at their ends to the respective side elements and pull the shaft 72 gently downwardly so that the wheels are in engagement to grip the paper received from the ramp 62.

The ramp 62 in the entry path 28 extends integrally into a narrower portion 78 which is cut away adjacent the element 60 to provide clearance for paper from the path 26 as will be described. The portion 78 lies in the aforementioned intermediate plane below a similar portion 80 of a guide plate which includes a portion 82 adjacent the rollers 66 and tending parallel to the ramp 62 so that paper riding up the ramp enters the gap between the portion 82 and the ramp and then progresses to enter the gap between the portions 78 and 80. It will be recognized that portion 80 lies in the aforementioned top plane and that the leading edge of paper coming up the ramp, once it is positioned between the portions 78 and 80, is then travelling between the top and intermediate planes in the aforementioned upper path.

As the leading edge of the paper leaves the portions 78 and 80, it enters the transfer station proper and comes between a guide plate 84 lying in the top plane and a further guide plate 86 lying in the intermediate plane. The paper is driven between these guide plates by a roller drive 88 driven from a shaft 90 in similar fashion to the previously described drive from shaft 68. As mentioned previously, the idler rollers are biased into engagement with the driven rollers lightly using springs, so that paper is driven by the arrangement but can be pulled through it because the springs do not hold the idle pulleys sufficiently to prevent forced movement The top guide plate 84 extends between the side elements 58, 60 and is cut away adjacent the paper curler 44 to define a deflecting edge 92 which will be described more fully later. A rectangular opening 94 is provided in the plate for inspection purposes and one side of the opening includes an upwardly angled flange 96 to ensure that paper travelling below the guide plate will not impact an edge of the opening 94 and become jammed in the apparatus. Deflection takes place by engagement on the underside of the flange 96. Also, because of the need to accommodate the curl (as will be described) the guide plate 86 is cut back more or less in alignment with the guide bar 52 and attached to this guide bar for support. The plate 86 does not extend to the side element 60 and another guide plate 98 is provided in the same plane as the guide plate 86 and attached to the side element 60. This smaller guide plate defines another deflecting edge 100 adjacent to and spaced below the edge 92 and angled differently for reasons which will be described. The deflecting edge 100 is aligned generally in parallel with the guide bar 52 and spaced from it.

Returning to the paper passing through the apparatus from the supply unit 24 (FIG. 1), it has now reached the transfer station 30 driven by the roller drive 88 and is guided through the station along the upper path between the top guide plate 84 and intermediate guide plates 86 and 92. These plates continue to guide the paper to meet another roller drive 102 which is connected to a shaft 104 of the drive train 70. This shaft projects through the plate 28 and carries a wheel 106 for reasons which will be described with reference to the path 26. Again, the roller drive 102 includes spring biased idler rollers which grip the paper but allow it to be pulled from the apparatus if necessary.

On leaving the roller drive 102, the leading edge of the sheet of paper engages a brush bar 108 which holds the paper downwardly in contact with a downwardly inclined ramp 110 extending between the side elements 58, 60. One side of the paper, i.e. adjacent element 60 is guided positively by the locating mechanism 36 which includes a guide element 112 spaced above the ramp 110 for containing the paper on the ramp. This guide element 112 is also used to mount an angled drive mechanism 114 which causes the paper to move both forwardly along the exit path 32 and also sideways into engagement with the side element 60 to better locate the paper ready for entry into the second printer 34 (FIG.

1). The guide element 112 is suspended from the side element 60 and defines slots receiving a pair of idler wheels 116, 118. These wheels are mounted independently on a pair of arms 120, 122 which are cantilevered on a pin 124 mounted on a bracket 126 of the guide element 112. The arms are biased by suitable spring means into engagement with complementary driven wheels 128, 130 by respective flexible drives 132, 134. These drives are connected to shafts 136, 138 and driven from the drive train 70 as will be described.

The arrangement of the idler wheel 118 and driven wheel 130 is better seen to a larger scale in FIG. 6. The wheel 130 is driven from the shaft 138 through the flexible drive 134 which is suspended between a pair of brackets 140, 142 which are angled with respect to one another to bring the wheel 130 into misalignment with the general direction of paper travelling over the ramp 110. The position of the wheel is such that it combines with the idler wheel 118 to form a nip which grips the paper 38 and moves it forwards and sideways into engagement with a side shoe 144 attached to the side of the ramp 110, the shoe being shaped to better control the side edge of the paper and prevent it sliding upwardly or downwardly. The side element 60 is slotted to accommodate the shoe 144.

As seen in FIG. 5, the drive train 70 is a toothed belt system with a prime mover in the form of an electric motor 146 mounted on the side element 58 and coupled to a toothed wheel 148 via the motor shaft 150. A primary toothed belt 152 extends about the wheel 148 past an idler 154 and over respective toothed wheels 156, 158 which drive the shafts 104, 90. A secondary toothed belt 160 is also driven from the wheel 158 to drive toothed wheel 162 on shaft 68. Similarly, a third belt 164 is driven by the wheel 148 directly from the motor and passes via an idler 166 over a pair of wheels 168, 170 which drive the shafts 136, 138. The arrangement is designed of course to ensure that the wheels are driven in the right direction so that paper will pass through the system.

Summarizing the description thus far, paper to be imaged on one side only and originating from the paper supply unit 24 shown in FIG. 1 will engage the ramp 62 and pass along an upper path between guide plates defining top and intermediate planes before exiting onto the ramp 110 where it is located against the shoe 144 before leaving to enter the imaging unit 34 (FIG. 1). Various sensors (not shown) are normally included so that should the paper fail to travel through the apparatus, the machinery would be shut off until the paper jam is removed. Such arrangements are common in paper transfer systems and are not included to simplify drawings.

Considering now the apparatus as is used to receive paper from the first imaging unit 22 (FIG. 1). It will be seen in FIG. 5 that the paper is received on a guide plate 172 forming the floor of the entry path 26 and supported between a pair of side members 174, 176. These side members are attached to the side element 60 and are positioned to either side of an opening 178 formed in this side member to receive the paper from the plate 172. A small top deflector plate 180 is attached to the side plate 174 and the paper will pass under this plate riding on the floor or guide plate 172. The paper progresses along this lower path under the influence of the unit 22 until the leading edge of the paper meets a roller drive 182 having upper idler rollers 184 and driven lower rollers 186. The lower rollers are driven from a wheel 188 which combines with a belt 190 to take drive from the wheel 106 on the shaft 104 of the drive system 102. As with other roller drives the idler rollers 184 ride on a shaft 192 which is biased by a pair of springs 194 (one of which can be seen) to ride in slots 196 in the side plates thereby bringing the idler rollers into contact with the driven rollers to form a nip to receive the paper. The structure here is also such that paper can be withdrawn by simply pulling it because there is insufficient tension in the springs to hold the paper.

The guide plate 172 supports paper entering the apparatus on the aforementioned bottom plane below the intermediate plane containing guide plates 86 and 98. As the paper meets the paper curler 44, the corner rises as seen for a sheet in a similar position in FIG. 8. This commences the curl which progresses as illustrated in FIG. 2 to come into contact with the guide bar 52 (FIG. 5). As this happens, the leading edge which is now directed towards the exit path 32 engages one or other of the deflecting edges 92, 100 to direct the leading edge of the paper between the guide plates 84 and 98 to follow the upper path between the intermediate and top planes. While this is happening, the curl is growing and where it is in contact with the guide bar 52 it is below the guide plate 86. The part of the paper adjacent this guide plate will always be below it and as the curl progresses the leading edge will advance towards the roller drive 102 with the part of the leading edge nearer to the side element 58 below the guide plate 86 and the part adjacent the side element 60 travelling between the guide plates 84 and 98. This minor variation in height between the opposite ends of the leading edge makes little difference when the leading edge meets the roller drive 102 so that the paper is picked up by the roller drive and projected to put the leading edge under the brush bar 108 and onto the ramp 110 where it follows the same path as the paper originating from the paper supply unit of FIG. 1.

Returning to FIG. 1, clearly the paper driven by the imaging unit 22 should travel slightly slower than the speed with which it is driven through the apparatus 20 to ensure that it remains flat. Similarly, the imaging unit 34 should be running slightly faster than the apparatus, so that in general, with each step, there is a slight increase in speed to ensure that the paper remains slightly in tension and therefore flat.

Although not shown in the drawings, there will of course be a simple control system to ensure that when paper is entering the apparatus from the imaging unit 22, the paper is not being supplied from the unit 24 and vice versa. Clearly the speed of throughput is dependent upon the maximum capacity of the imaging unit 34.

Reference is next made to FIG. 7 which illustrates a second embodiment of the apparatus according to the invention incorporated in a system for duplex imaging or using both imaging units for single sided imaging. A first imaging unit 198, in one of the modes, feeds paper to a second imaging unit 200 which can also receive paper from a paper supply unit 202. Also, the imaging unit 198 can provide a single sided image for delivery to a paper receiving unit 204. The apparatus includes an entry path 206, transfer station 208, exit path 210 and second entry path 212. Although the apparatus is similar to that described with reference to previous figures, there are differences which are necessary primarily in order that the paper from the imaging unit 198 can pass in a straight line through the transfer unit 208 to the receiving unit 204. This arrangement makes it possible for the imaging units 198 and 200 to be used simultaneously for single sided printing because the transfer unit allows sheets to travel both from the paper supply unit 202 and from the imaging unit 198 through the transfer station without interfering with one another. The structure which permits this will now be described.

Reference is now made to FIG. 8 which illustrates apparatus with a portion lying in a top plane removed to improve the clarity of drawing. This portion corresponds to the plate 84 and associated parts shown in FIG. 5.

The paper entering path 206 meets a paper curler 214 under the influence of a roller drive 216. The paper curler 214 differs from that described previously in that it is mounted for movement under the influence of a solenoid 218 to either deflect the paper as shown in FIG. 8 or to permit it to pass directly through the apparatus towards the paper receiving unit 204 seen in FIG. 7.

Reference is next made to FIG. 9 to describe the operation of the paper curler 214. As seen in FIG. 9, the solenoid 218 is capable of moving the paper curler 214 from the position shown in full outline to a position shown in ghost outline. The device is mounted on a side plate 220 which also supports the floor 222 having an opening 221 to accommodate part of the paper curler 214. As a sheet of paper 224 is driven by the roller drive 216 towards the paper curler, the leading edge meets the paper curler and, through a combination of the roller drive and the paper curler, the paper begins to form a curl as seen in FIG. 8. The operation then proceeds as described previously with reference to FIG. 5. In the event that the paper is to pass directly through the transfer mechanism without curling, the solenoid 218 is actuated to move the paper curler 214 further into the position shown in ghost outline where the bottom of the curler is above and clear of the sheet of paper. Clearly the paper will then proceed past the paper curler without being influenced by it.

Turning to FIG. 8, when the paper is to pass directly through the apparatus, it passes under guide bar 226 which is suspended from side plate 228. The paper travels across a floor 230 which is a continuation of the floor 222 (FIG. 9) and lies in the bottom plane when compared with the intermediate and top planes described previously with reference to FIG. 5. The paper continues across the floor 230 until it meets a roller drive 232 which projects the paper through an opening 234 in the side of the apparatus. The paper is then free to travel to the paper receiving unit 204 shown in FIG. 7.

A portion of the apparatus shown in FIG. 8 is designated in the ringed numeral "10" and this indicates the general area of the perspective view FIG. 10, which better illustrates portions of the device to a larger scale. In FIG. 10 it will be seen that a sheet of paper 235 is travelling over the floor 230 towards the roller drive 232 where it meets driven rollers 236 carried on a shaft 237 which is driven from a toothed wheel 238 by a belt 240. This belt passes around a split idler 242 and on to a further pulley 244 attached to a shaft 246 which corresponds as far as the drive chain is concerned with the shaft 104 shown in FIG. 5. The shaft 237 is carried on brackets below the floor 230 and corresponding idler rollers 248 are carried on a shaft 250 which, like the other idler shafts already described, is biased by springs to bring the idler pulley into engagement with the driven pulleys. The shaft 250 is carried on brackets suspended from the guide plate 228 which in turn is mounted on side element 252. This element defines the opening 234 which is in effect an extended slot through which the paper passed freely driven by the roller drive 232. This drive is sufficient to project the paper sheets into the receiving unit 204 shown in FIG. 7.

It will be evident from previous description and also from a comparison of FIGS. 7 to 10 that when a sheet of paper is to be printed on one side only by printer 22, it is driven through the apparatus only after the paper curler 214 has been moved to the ghost outline position of FIG. 9 by the solenoid 218. The paper is then free to travel underneath the guide bar 226 resting on the floor 230 until it meets the roller drive 232 which pushes it out of the apparatus and into the receiving unit 204. Otherwise, the apparatus operates in the same fashion as that described with reference to FIG. 5 although it must be noted that in FIG. 5 the guide bar 52 is resting on the floor of the apparatus because there is no need in the FIG. 5 embodiment to have a space between the bar and the floor. In the FIG. 8 embodiment, clearly the structure must be designed with sufficient strength that the cantilevered guide plate 228 supports the bar 226 above the floor 230 at all times.

As mentioned previously with reference to FIG. 5, the apparatus can be used in conjunction with printers and copiers. It is even possible to copy at unit 198 and print at unit 200 if one side only is required. However, the main purpose of the apparatus is to provide mixed results, either by printing or copying on both sides or on one side only and to take advantage of the fact that there are two printers in the system and have them both operate when imaging is required on one side only.

Other embodiments are within the scope of the invention as claimed.

We claim:

1. Apparatus for selectively imaging one side or both sides of sheets, the apparatus comprising:

first imaging means to image first sides of the sheets when both sides are to be imaged;

means defining a first entry path for receiving the sheets serially from the imaging means;

a transfer station for receiving the sheets from the first entry path in a first plane and including sheet inverting means for turning the sheets over and into a second plane adjacent to and spaced from the first plane;

means defining a second entry path for delivering sheets serially to be imaged on one side only, the second entry path delivering sheets to the transfer station in the second plane;

means defining an exit path for receiving sheets from the transfer station in said second plane;

second imaging means for receiving sheets from the exit path to image one side of the sheets originating from the second entry path and to image the second sides of sheets originating at the first imaging means; and said sheet inverting means including a curler positioned in the first entry path for initiating a curl in the sheet so that the sheet then turns over, the curler being out of alignment with the second entry path so that sheets passing along the second entry path move past the curler without engagement.

2. Apparatus as claimed in claim 1 and further including a means defining a second exit path for receiving sheets from the transfer station in said first plane, the second exit path being in alignment with the first entry path, and in which the curler is moveable from a first position in the first entry path to a second position remote from the first entry path so that when in the second position, sheets from the first entry path pass directly through the transfer station imaged on one side only and leave via the second exit path.

3. Apparatus as claimed in claim 1 and further including drive means coupled for driving the sheets through the apparatus, the drive means driving the sheets at a greater speed through the second imaging means than through the first imaging means so that sheets entering the first imaging means serially will be spaced from one another on leaving the second imaging means.

4. Apparatus as claimed in claim 1 in which the transfer station further includes means guiding the sheet as it is turned over so that as the leading edge of the sheet moves towards the exit path, a portion of the leading edge adjacent the first entry path lies in said second plane and the remainder of the leading edge lies in said first plane.

5. Apparatus for transporting sheets from first and second entry paths to an exit path, the entry paths lying at an angle to one another in adjacent planes, and the second entry paths and the exit paths being aligned with one another in the same plane, the apparatus comprising:

a paper curler positioned at a side of the first entry path remote from the exit path and out of alignment with a second entry path so that a sheet travelling from the first entry path meets the curler adjacent a corner of the sheet, and as the sheet continues to move, the leading edge of the sheet adjacent said corner is deflected into a curl which grows across the sheet as the sheet travels from the first entry path, and so that a sheet of paper travelling from the second entry path to the exit path passes the curler with the curler to one side of the sheet;

a guide bar at the end of the first entry path and lying at half the angle between the first and second input paths with respect to the direction of travel of the sheet along the first entry path, the guide bar being positioned to deflect the growing curl so that the sheet from the first entry path is directed into the exit path in alignment with the second entry path, the guide bar being proportioned to be in the first entry path and clear of the second entry path; and drive means operable selectively to move paper from the first or second entry paths through the apparatus and out through the exit path.

* * * * *